Sept. 29, 1959

R. H. J. GENESLAY
DAMPING SYSTEMS 2,906,899

Filed Sept. 27, 1956

United States Patent Office 2,906,899
Patented Sept. 29, 1959

2,906,899

DAMPING SYSTEMS

Raymond Henri Joseph Geneslay, Viroflay, France

Application September 27, 1956, Serial No. 612,560

Claims priority, application France October 8, 1955

7 Claims. (Cl. 310—93)

My invention has for its object a damping system adapted to damp linear movements under the action of electromagnetic forces. Multiple embodiments of damping systems for linear oscillations, of the hydraulic type, are already known in the art. Such systems of which a large number are satisfactory require however a high accuracy in manufacture and they are furthermore intricate and their cost price is high. In contradistinction, my improved damping system is simple and sturdy and cannot be misadjusted; it includes only a small number of parts and its operation is highly reliable.

My improved damping system resorts to the property of magnets having a high coercive force and its principle consists chiefly in shifting longitudinally such a magnet inside a tube forming a magnetic circuit, while rings or annuli alternatingly of magnetic metal and of non-magnetic electrically conductive metal are fitted inside the space separating the magnet from the tube so as to produce inside the conductive metal rings intense induced currents which produce the desired damping action, said induced currents transforming into heat the kinetic energy of the system connected with the movable gear constituted by the magnet.

It should be remarked that the operation of such a damping system does not rely in practice on the magnetic action exerted between the stationary and the movable section of the magnetic circuit. In other words, if the conductive rings referred to hereinabove were replaced by insulating rings, this would practically cut out the damping effect sought for.

In accompanying drawings given by way of example, I have shown diagrammatically in Fig. 1 a first embodiment of my invention.

Figure 1:
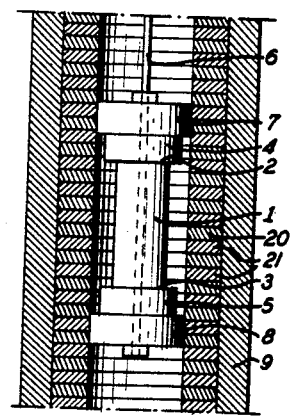

Turning to Fig. 1, the damping system is constituted by parts of revolution, Fig. 1 being an axial cross-section through same.

The damping system includes chiefly a cylindrical permanent magnet having a circular cross-section, which is magnetized in the direction of its axis, the north pole lying on one terminal surface, 2 for instance, and the south pole on the opposite terminal surface 3.

To either end of said magnet are secured two cylindrical pole-pieces 4 and 5 the diameters of which are larger than that of the magnet; the system including the pole-pieces 4 and 5 is fitted over a spindle 6. The terminal members 7 and 8 of a non-magnetic metal have diameters larger than that of the pole-pieces and are intended to provide for the guiding of the system 1, 4, 5 while avoiding any adherence between the stationary and movable parts of the magnetic circuit.

Preferably, the parts 1, 4, 5, 7, 8 are all axially perforated so as to carry the guiding rod or spindle 6. The whole mechanical arrangement constituted by said parts 1 to 8 forms for instance the movable gear of the damping system and is adapted to move axially inside a coaxial tube 9 of magnetic material.

The inner diameter of the tube 9 is larger than the diameter of the terminal members 7 and 8. In the annular gap separating the tube from the movable gear, is inserted a superposed system of identically shaped rings or annuli constituted in alternation by annular members 20 of magnetic metal and by annular members 21 of a metal which is non-magnetic and which is a good conductor for electricity; thus, the former members may be made of magnetic steel and the latter of copper. The outer diameter of said members is equal to the inner diameter of the tube 9 while their inner diameter is equal with a slight clearance to that of the terminal members 7 and 8 so that, from a mechanical standpoint, said stationary rings or annuli guide the movable gear in its movements with reference thereto with a slight friction. Furthermore, the axial height of the pole-pieces is preferably selected so that its magnitude may be of the same order as twice the thickness of the annuli. The rings or annuli are obviously secured to the magnetic tube 9 in any suitable manner.

It is immediately apparent that any longitudinal movement of the movable gear with reference to the stationary system constituted by the tube 9 and the rings produces modifications in the flux passing through the conductive metal chiefly at the moment where the ends of a pole-piece register transiently with the magnetic rings to either side of a non-magnetic ring 21, said modifications in flux being obtained through a sequence of phenomena similar to that appearing in a conventional electric motor when the periphery of the rotor moves in front of the stator notches.

It is apparent that these modifications in flux produce induced currents the amplitude of which is considerable by reason of the small resistance of the rings made of conductive metal which are of course made of a single part.

This leads therefore to a considerable damping as the electro-magnetic forces exerted by the rings located in front of both terminal pole-pieces act in the same direction and are added together.

Obviously, during the longitudinal movements of the movable gear, each of the conductive rings 21 acts in its turn so that the total action exerted is practically constant throughout the path travelled over by the movable gear. It is sufficient to this end to provide stacks of rings of a suitable height, taking into account the maximum amplitude desired for the shifting of the movable gear.

Experience shows that an arrangement of the type described having a comparatively reduced diameter allows a very energetic damping of the movements of a mass of several hundred kilograms within periods of a magnitude of a few seconds under amplitudes reaching several centimeters.

Thus, this type of damping system is of a particular interest when applied as a shock absorber to automobiles although the invention is not limited to such a single application.

In the embodiment described hereinabove, the rings have a constant height throughout a radial direction and the copper and steel rings are identical as to shape and size with one another.

It is however of greater advantage in order to reduce the ohmic resistance of the ring to resort to rings having different shapes, the copper rings having an increasing thickness from the inner edge towards the outer edge. This increase in thickness may be for instance substantially linear so that said copper rings have a trapezoidal cross-section as illustrated in a diagrammatic manner in Fig. 2 for an easier understanding of the invention. In said Fig. 2 which is a detail view of the cross-section of two successive trapezoidal rings 20 and 21, the non-hatched area is that of a non-magnetic copper ring 21 while the hatched area is that of a steel ring 20, the inner edges of the rings being shown at 10 and the outer edges at 11.

This allows producing rings in which each element extending along a same radius has the same resistance, provided the rate of increase in height is selected in a manner such that, the height $h$ being associated with a radius $r$ as shown in the drawing, their product: $hr$ is a constant throughout the ring.

It will be remarked that the reduction in the outer diameter does not lead as a counterpart to an increase in the reluctance of the magnetic circuit formed by the steel ring since said reluctance is also proportional to the product $hr$ and it is therefore apparent that with rings for which the product $hr$ is substantially constant, the reluctance of the magnetic circuit is substantially equal to that of steel rings having a constant thickness $ho$ equal to the thickness along the outer edge 11 of said ring.

It is a known fact that the speed of establishment of the current inside a ring depends on the self-inductance of the latter. To increase the speed of the electromagnetic response, it may be of advantage in accordance with a further feature of the invention to subdivide the ring into a plurality of rings of a reduced thickness. This leads to fractionating the pole-pieces by providing notches along their edges.

Figure 3:
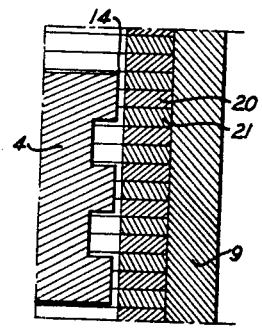
Fig. 3 illustrates a further detail modification of the said embodiment.

Fig. 3 shows on a larger scale a detail view of this modification. In said figure, 14 designates the outer edge of pole-pieces such as 4 in Fig. 1, said pole-pieces moving inside the rings 20—21 which are illustrated as all similar to one another and which are of course alternatingly of magnetic metal and of an electrically conductive non-magnetic metal.

In this modification, the total damping is the same as that obtained in the case of the damping system of Fig. 1 but the speed of response is increased.

Figure 2:
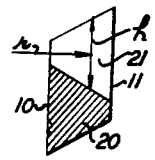
Fig. 2 is a detail view of a particular form of the rings fitted in the magnetic tube.

Obviously, it is possible to associate the two modifications of Figs. 2 and 3. Similarly, it is possible to insert over a same rod 6 a plurality of systems of magnets and pole-pieces so as to increase the damping effect obtained.

What I claim is:

1. A system for damping linear oscillations of a movable part, comprising a magnet, a tubular magnetic member inside which the magnet is adapted to move along an axial path, a stack of annular members inside the tubular member and surrounding the path followed by the magnet, said annular members being alternately of a magnetic metal and of an electrically conductive non-magnetic metal, and a rod extending longitudinally inside the tube and rigidly connecting the magnet with the movable part.

2. A system for damping linear oscillations of a movable part comprising a cylindrical permanent magnet including terminal pole-pieces, a tubular magnetic member inside which said magnet is arranged coaxially and is adapted to move along an axial path, a stack of annular members secured inside the tubular member and surrounding the path followed by the magnet, said annular members being alternately of a magnetic metal and of an electrically conductive non-magnetic metal, and a rod extending longitudinally inside the tube and rigidly connecting the magnet with the movable part.

3. A system for damping linear oscillations of a movable part comprising a cylindrical permanent magnet including terminal pole-pieces, a tubular magnetic member inside which said magnet is arranged coaxially and is adapted to move along an axial path, a stack of annular members secured inside the inner wall of the tubular member and surrounding the path followed by the magnet, said annular members being alternately of a magnetic metal and of an electrically conductive non-magnetic metal, terminal non-magnetic members rigid with said magnet to guide the same inside the stack of annular members, and a rod extending longitudinally inside the tube and rigidly connecting the magnet with the movable part.

4. A system for damping linear oscillations of a movable part comprising a plurality of longitudinally spaced coaxial cylindrical permanent magnets including terminal pole-pieces, a tubular magnetic member inside which said magnets are arranged coaxially and are adapted to move along an axial path, a stack of annular members secured inside the inner wall of the tubular member and surrounding the path followed by the magnets, said annular members being alternately of a magnetic metal and of an electrically conductive non-magnetic metal, and a rod extending longitudinally inside the tube and rigidly connecting the magnets with the movable part.

5. A system for damping linear oscillations of a movable part comprising a magnet, a tubular magnetic member inside which the magnet is adapted to move along an axial path, a stack of annular members secured inside the inner wall of the tubular member and surrounding the path followed by the magnet, said annular members being alternately of a magnetic metal and of an electrically conductive non-magnetic metal, the axial height of said members along an annular section thereof varying with the radius of the latter, and a rod extending longitudinally inside the tube and rigidly connecting the magnet with the movable part.

6. A system for damping linear oscillations of a movable part comprising a magnet, a tubular magnetic member inside which the magnet is adapted to move along an axial path, a stack of annular members secured inside the inner wall of the tubular member and surrounding the path followed by the magnet, said annular members being alternately of a magnetic metal and of an electrically conductive non-magnetic metal, said magnetic members having an increasing height from the inside to the outside and the electrically conductive members having an increasing height from the outside to the inside thereof, and a rod extending longitudinally inside the tube and rigidly connecting the magnet with the movable part.

7. A system for damping linear oscillations of a movable part comprising a magnet including terminal pole-pieces having transverse notches along their inner peripheries, a tubular magnetic member inside which the magnet is adapted to move along an axial path, a stack of annular members secured inside the inner wall of the tubular member and surrounding the path followed by the magnet, said annular members being alternately of a magnetic metal and of an electrically conductive non-magnetic metal, each annular member being constituted by a plurality of flat superposed similar rings, and a rod extending longitudinally inside the tube and rigidly connecting the magnet with the movable part.

References Cited in the file of this patent

UNITED STATES PATENTS

| 1,912,167 | Anderson | May 30, 1933 |
| 2,366,286 | Pounds | Jan. 2, 1945 |
| 2,749,454 | Little | Aug. 28, 1953 |

FOREIGN PATENTS

| 292,071 | Great Britain | Dec. 13, 1928 |
| 684,475 | Great Britain | Dec. 17, 1952 |
| 730,683 | Germany | Jan. 15, 1943 |